(12) United States Patent
Brown

(10) Patent No.: US 12,344,156 B2
(45) Date of Patent: Jul. 1, 2025

(54) ADJUSTABLE CARGO STRAP

(71) Applicant: Terry Kevin Brown, Alabaster, AL (US)

(72) Inventor: Terry Kevin Brown, Alabaster, AL (US)

(*) Notice: Subject to any disclaimer, the term of this patent is extended or adjusted under 35 U.S.C. 154(b) by 624 days.

(21) Appl. No.: 17/826,086

(22) Filed: May 26, 2022

(65) Prior Publication Data

US 2022/0379799 A1 Dec. 1, 2022

Related U.S. Application Data

(60) Provisional application No. 63/195,053, filed on May 30, 2021.

(51) Int. Cl.
*B60P 7/08* (2006.01)

(52) U.S. Cl.
CPC .................... *B60P 7/0823* (2013.01)

(58) Field of Classification Search
CPC ..... B60P 7/0853; B60P 7/0807; B60P 7/0823; B61D 45/00; B62J 7/08; B65D 47/0842; B65D 47/0852; F21V 21/0816; A63F 2250/121; A44B 11/14; Y10T 24/2175
USPC .............................................. 410/96, 97, 100
See application file for complete search history.

(56) References Cited

U.S. PATENT DOCUMENTS

| | | | | |
|---|---|---|---|---|
| 8,827,245 | B2* | 9/2014 | Pate | A22B 5/00 254/1 |
| 2003/0161699 | A1* | 8/2003 | Austin | B61D 45/001 410/97 |
| 2005/0180835 | A1* | 8/2005 | Schneider | B60P 7/0823 410/100 |
| 2013/0034401 | A1* | 2/2013 | Sauerwald | B60P 7/0876 410/101 |

FOREIGN PATENT DOCUMENTS

GB 2284229 A * 5/1995 ............ B60P 7/0823

OTHER PUBLICATIONS

Powder-Coated D-Rings (Year: 2019).*

* cited by examiner

*Primary Examiner* — Steven O Douglas
(74) *Attorney, Agent, or Firm* — H. Brock Kolls

(57) ABSTRACT

The present invention relates to an adjustable cargo strap configured with hook latches at both ends and cam buckles for tensioning the strap proximate to both ends. A series of pass-through connectors configure lengths of straps that run between the cam buckles forming one or two cargo areas where one or both cargo areas can be used to secure odd-shaped cargo easily. In operation, a user can secure the hook latches between the opening of a truck bed, or other span or opening. Cargo can be placed in the cargo areas. The loose ends of the cam buckle straps can be pulled to remove any slack in the straps. Each of the cam buckles can then be adjusted in ratchet or pull-and-grip style by the user to increase the force on the strap causing the cargo areas to be constricted around and secure the cargo.

20 Claims, 10 Drawing Sheets

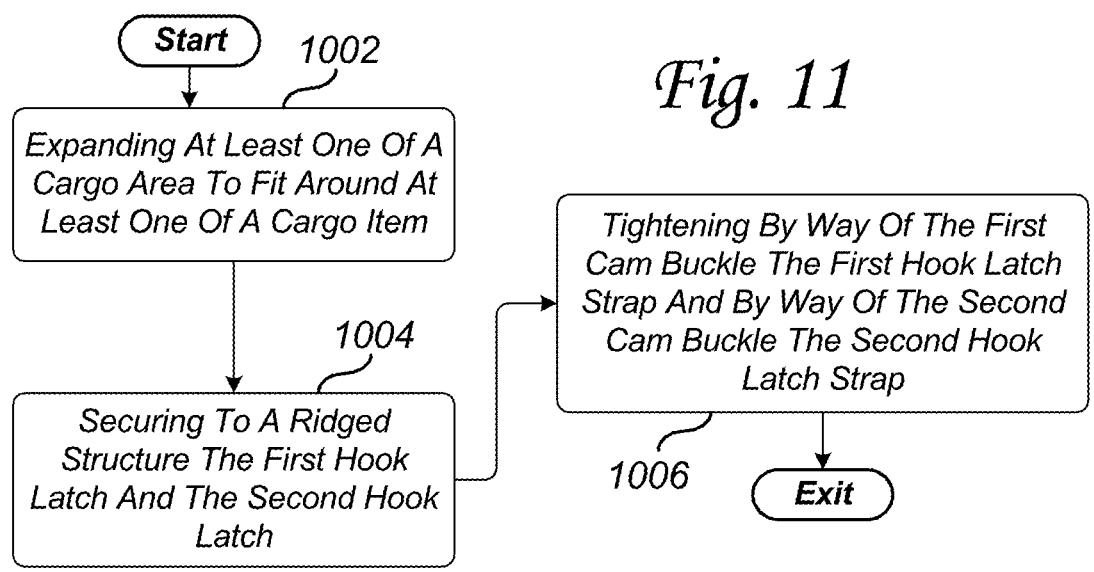

ADJUSTABLE CARGO STRAP

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that claims the benefit of a U.S. provisional application, Ser. No. 63/195,053, inventor Terry Kevin Brown, entitled "ADJUSTABLE CARGO STRAP", filed May 30, 2021.

TECHNICAL FIELD OF THE INVENTION

This invention relates to an adjustable cargo strap configured with hook latches at both ends and cam buckles for tensioning the strap located proximate to both ends. A series of pass-through connectors configure lengths of straps that run between the cam buckles forming one or two cargo areas where one or both cargo areas can be used to secure odd-shaped cargo.

BACKGROUND OF THE INVENTION

Before our invention shortcomings of trying to secure cargo in an open area, such as in the back of a truck without the cargo touching at least two ridged surfaces such as the truck bed liner and a truck bed sidewall were difficult. Improvised solutions might include stacking objects behind the cargo to take up space and then securing the cargo to these objects. Other solutions might include using multiple cargo straps or ropes to crisscross the cargo. Yet other solutions might include placing a tarp over the cargo and then securing the tarp.

Another shortcoming of the prior art is that strapping down odd-shaped objects such as coolers, gas cans, propane tanks, or the like, is a challenge with existing tie-down straps as they are intended to hold the object against, or down to a hard surface such as a truck bed or truck cab and the odd-shape of the object can make that difficult.

The present invention addresses these and other shortcomings and provides other advantages by providing an adjustable cargo strap. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an adjustable cargo strap comprising a first hook latch having a first open end and a first hole end. A first cam buckle has a first closed-end and a first pass-through end. A first hook latch strap has a first buckle end that is fastened to the first closed-end and a first hook end that is fastened to the first hole end. A second hook latch has a second open end and a second hole end. A second cam buckle has a second closed-end and a second pass-through end. A second hook latch strap has a second buckle end that is fastened to the second closed-end and a second hook end that is fastened to the second hole end.

The adjustable cargo strap further comprises a first pass-through connector, a second pass-through connector, and a first cam buckle strap having a first strap end that is fastened to the second pass-through connector and a first loose end that passes through the first pass-through connector and then passes through the first pass-through end. And, a second cam buckle strap has a second strap end that is fastened to the first pass-through connector and a second loose end that passes through the second pass-through connector and then passes through the second pass-through end. Wherein a cargo area for storing a cargo item is formed between the first cam buckle strap and the second cam buckle strap.

Additional shortcomings of the prior art are overcome and additional advantages are provided through the provision of an adjustable cargo strap comprising a first hook latch having a first open end and a first hole end. A first cam buckle has a first closed-end and a first pass-through end. A first hook latch strap has a first cam buckle end that is fastened to the first closed-end and a first hook end that is fastened to the first hole end. A second hook latch has a second open end and a second hole end. A second cam buckle has a second closed-end and a second pass-through end. A second hook latch strap has a second cam buckle end that is fastened to the second closed-end and a second hook end that is fastened to the second hole end.

The adjustable cargo strap further comprises a first pass-through connector, a second pass-through connector, and a connector strap having a first connector end fastened to the first pass-through connector and a second connector end fastened to the second pass-through connector.

The adjustable cargo strap further comprises a third pass-through connector, a fourth pass-through connector, and a first cam buckle strap having a first strap end that is fastened to the third pass-through connector and a first loose end that passes through the first pass-through connector and then passes through the third pass-through connector and then passes through the first pass-through end. And a second cam buckle strap has a second strap end that is fastened to the fourth pass-through connector and a second loose end that passes through the second pass-through connector and then passes through the fourth pass-through connector and then passes through the second pass-through end. Wherein a first cargo area for storing a first cargo item is formed between the first cam buckle strap, the first pass-through connector, and the third pass-through connector. Wherein a second cargo area for storing a second cargo item is formed between the second cam buckle strap, the second pass-through connector, and the fourth pass-through connector.

Additional shortcomings of the prior art are overcome and additional advantages are provided through the provision of a method of using an adjustable cargo strap. The method comprises the steps of expanding at least one cargo area to fit around at least one cargo item by way of the adjustable cargo strap having a single cargo area comprising a first hook latch having a first open end and a first hole end, a first cam buckle having a first closed-end and a first pass-through end. A first hook latch strap has a first buckle end that is fastened to the first closed-end and a first hook end that is fastened to the first hole end. A second hook latch has a second open end and a second hole end. A second cam buckle has a second closed-end and a second pass-through end. A second hook latch strap has a second buckle end that is fastened to the second closed-end and a second hook end that is fastened to the second hole end. A first pass-through connector, a second pass-through connector, a first cam buckle strap having a first strap end that is fastened to the second pass-through connector, and a first loose end that passes through the first pass-through connector and then passes through the first pass-through end. And a second cam buckle strap has a second strap end that is fastened to the first pass-through connector and a second loose end that passes through the second pass-through connector and then passes through the second pass-through end. Wherein a cargo area for storing a cargo item is formed between the first cam buckle strap and the second cam buckle strap.

Or, the adjustable cargo strap has a double cargo area comprising the first hook latch having the first open end and the first hole end. The first cam buckle has the first closed-end and the first pass-through end. The first hook latch strap has the first cam buckle end that is fastened to the first closed-end and the first hook end that is fastened to the first hole end. The second hook latch has the second open end and the second hole end. The second cam buckle has the second closed-end and the second pass-through end. The second hook latch strap has the second cam buckle end that is fastened to the second closed-end and the second hook end that is fastened to the second hole end. A first pass-through connector, a second pass-through connector, a connector strap having a first connector end fastened to the first pass-through connector and a second connector end fastened to the second pass-through connector. A third pass-through connector, a fourth pass-through connector, the first cam buckle strap having a first strap end that is fastened to the third pass-through connector and the first loose end that passes through the first pass-through connector and then passes through the third pass-through connector and then passes through the first pass-through end. And the second cam buckle strap has the second strap end that is fastened to the fourth pass-through connector and the second loose end that passes through the second pass-through connector and then passes through the fourth pass-through connector and then passes through the second pass-through end. Wherein the first cargo area for storing a first cargo item is formed between the first cam buckle strap, the first pass-through connector, and the third pass-through connector. Wherein a second cargo area for storing a second cargo item is formed between the second cam buckle strap, the second pass-through connector, and the fourth pass-through connector.

The method continues by securing to a ridged structure the first hook latch and the second hook latch., and tightening by way of the first cam buckle the first hook latch strap and by way of the second cam buckle the second hook latch strap.

Additional features and advantages are realized through the techniques of the present invention. Other embodiments and aspects of the invention are described in detail herein and are considered a part of the invention. For a better understanding of the invention with advantages and features, refer to the description and the drawings.

BRIEF DESCRIPTION OF THE FIGURES

The foregoing and other objects, features, and advantages of the invention are apparent from the following detailed description taken in conjunction with the accompanying drawings in which:

FIG. 11 illustrates one example of a method of using an adjustable cargo strap.

Figure 1:
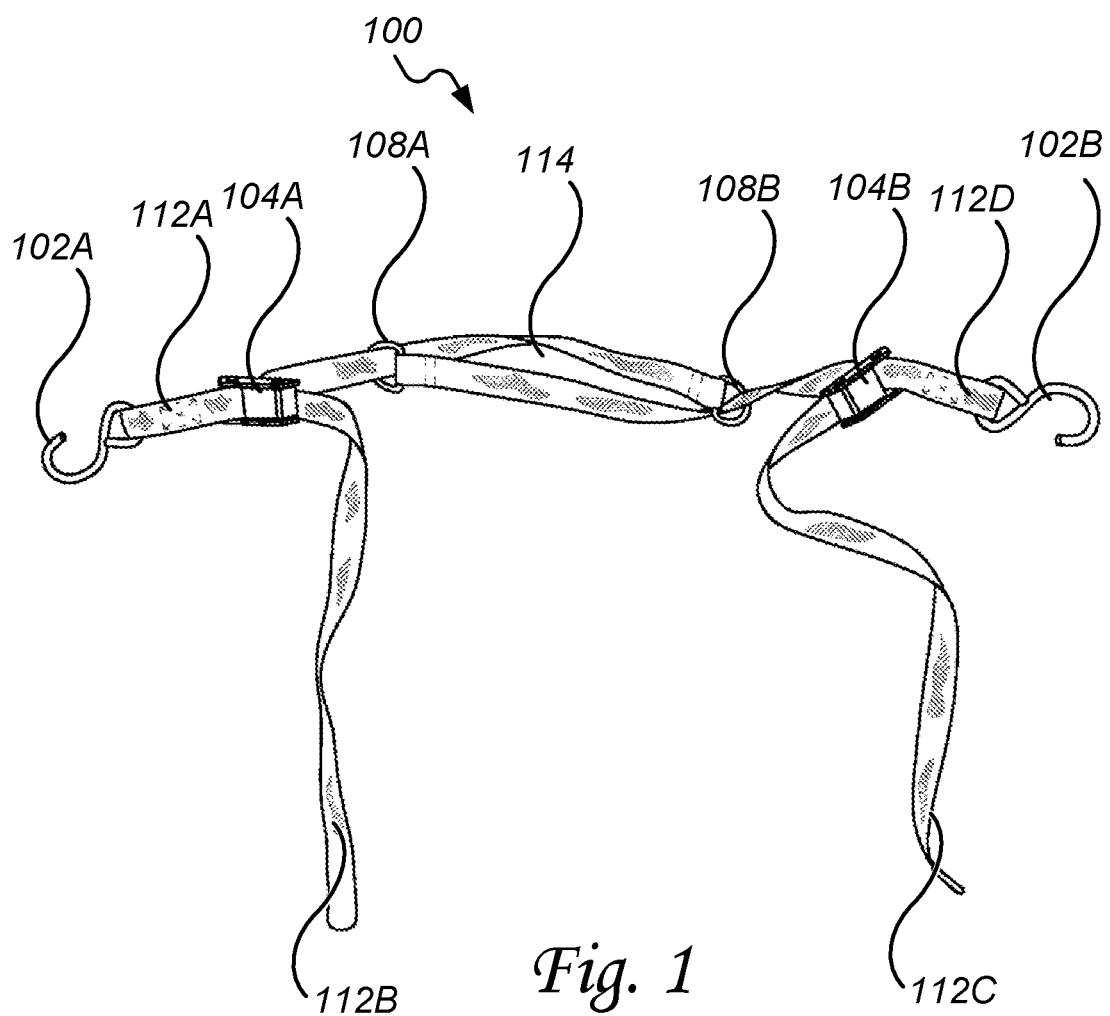
FIGS. 1-2 illustrate examples of an adjustable cargo strap having a single cargo area.

The detailed description explains the preferred embodiments of the invention, together with advantages and features, by way of example with reference to the drawings.

DETAILED DESCRIPTION OF THE INVENTION

One advantage of the present invention is that it provides a user with a more secure way to strap down odd-shaped objects in a vehicle. Another advantage is that the adjustable cargo strap 100 separates creating one or more cargo areas 114 wherein odd-shaped objects can be placed and secured. In an exemplary embodiment, this is done by having an overlapping figure-eight style strap design that allows the adjustable cargo strap 100 to be pulled apart creating one or more cargo areas 114 that wrap around odd-sized objects. The adjustable cargo strap 100 is then tightened constricting the cargo area 114 sections around the odd-sized objects. The adjustable cargo strap 100 can be tightened by way of cam buckles 104 which are located proximate to each end of the adjustable cargo strap 100. The cam buckles 104 are configured to ratchet or pull-and-grip similarly tighten the strap as a come-along style strap system.

In an exemplary embodiment, the adjustable cargo strap 100 itself is configured in a pass-through formation, that creates cargo area 114 sections that are segmented by using pass-through connectors 108, also called rings. The pass-through connectors 108 configure the overlapping, figure-eight strap formation. The adjustable cargo strap 100 can also be pulled tight from either end, by pulling the pass-through connectors 108 together by the handle straps 118.

The straps 112/118, of the present invention, can be manufactured from wire rope, braided fiber, rope, polyester webbing, or other materials, as may be required and/or desired in a particular embodiment. Such braided fibers or rope can be manufactured from natural or synthetic materials. The cam buckles 102 and the pass-through connectors 108 can be stainless steel, optionally powder-coated, or other materials and have other coatings, as may be required and/or desired in a particular embodiment.

Figure 2:
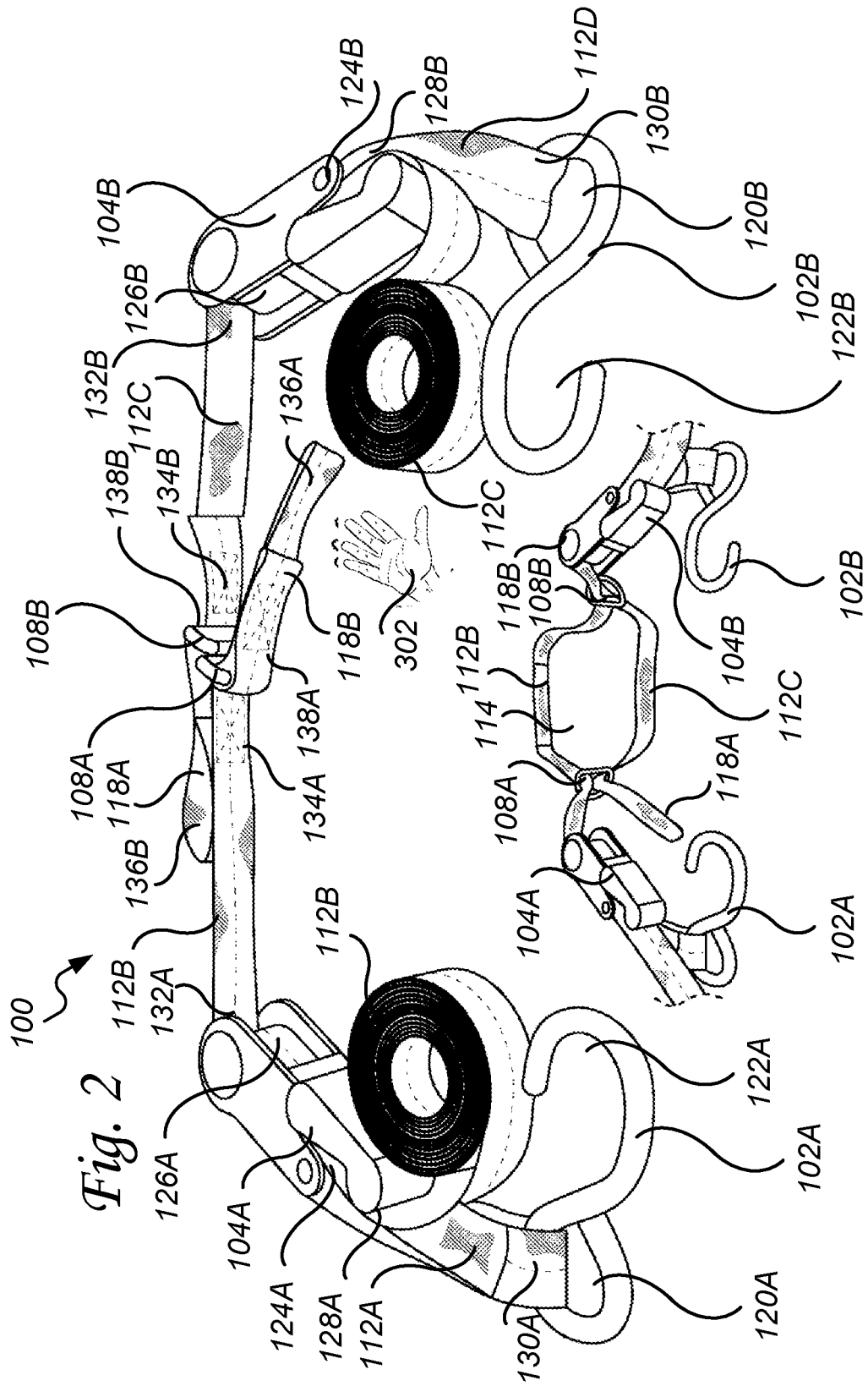
Figure 5:
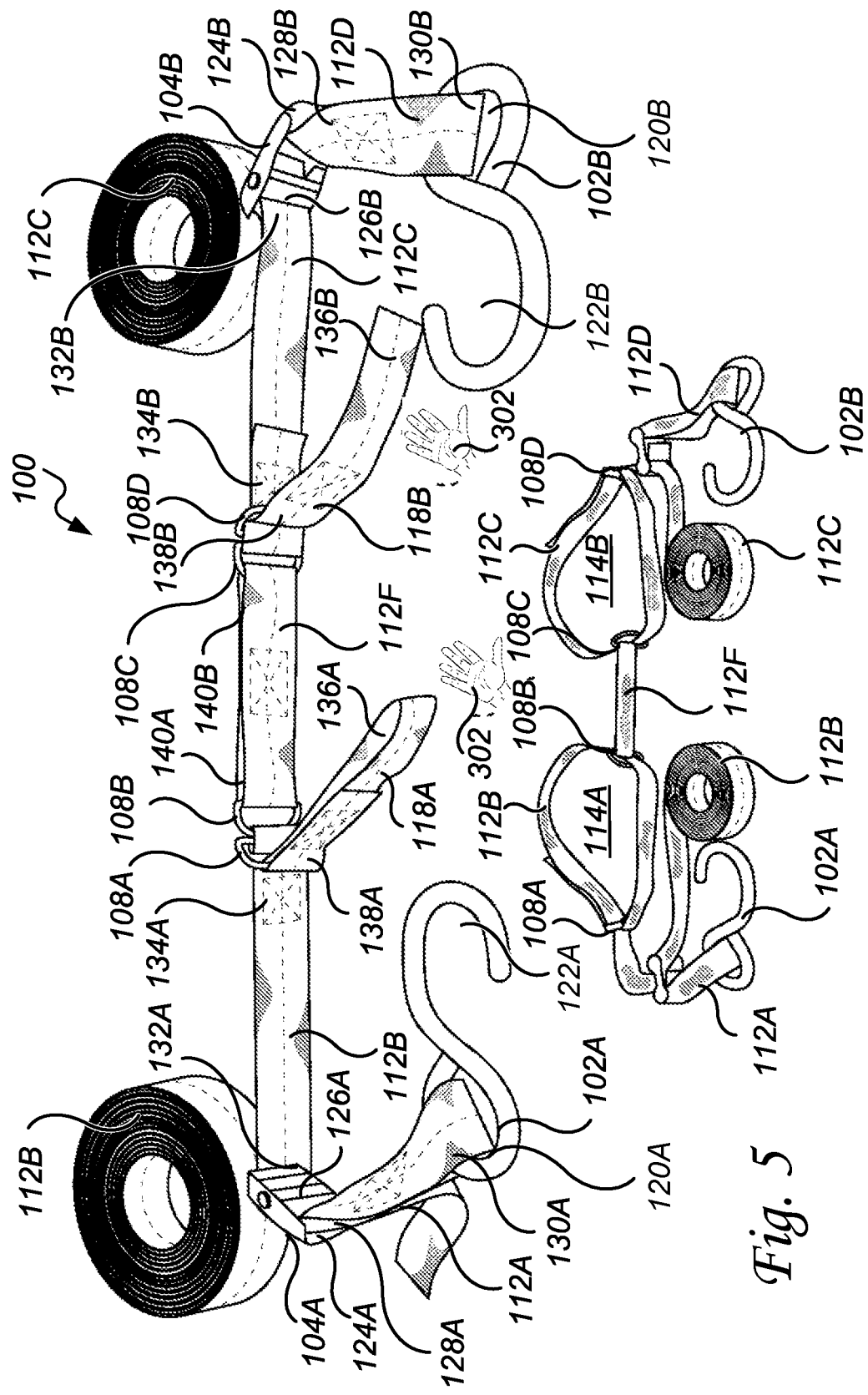
FIG. 5 examples of an adjustable cargo strap having two cargo areas.

In an exemplary embodiment, Each of the cam buckles 104A and 104B can ratchet-style like illustrated in at least FIG. 2, pull-and-grip style like illustrated in at least FIG. 5, or other styles, as may be required and/or desired in a particular embodiment.

In an exemplary embodiment, straps 112/118 ends can be fastened by wrapping around a pass-through connector 108, a cam buckle 104 closed-end 124, or other object and sewn to itself or otherwise secured to itself. In addition, the handle strap 118, loop end 136 can be folded back and the lower portion sewn to itself or otherwise secured to itself to create the handle loop.

In an exemplary embodiment, applications of the adjustable cargo strap 100 can include, for example, and not a limitation, hauling cargo wherein the cargo is secured in an open space without touching vehicle walls such as in the back of a truck bed. Cargo items can be, for example, and not a limitation cargo 206, 208, 210, 212, and other types and kinds of cargo, as may be required and or desired in a particular embodiment. Other applications, with or without securing cargo within cargo areas 114 can include securing bikes, motorcycles, jet skis, all-terrain vehicles (ATV), boats, or other vehicles that are contained in the back of a truck bed or on a trailer.

Turning now to the drawings in greater detail, it will be seen that in FIG. 1 there is illustrated one example of an adjustable cargo strap 100 having a single cargo area 114. In an exemplary embodiment, a first hook latch 102A has a first hook at one end and a first hole at the other end through which one end of a first hook latch strap 112A is fastened. The other end of the first hook latch strap 112A is fastened to a first cam-buckle 104A. One end of a first cam buckle strap 112B passes through the cam buckle 104A, then passes through pass-through connector 108A, forming one side of the single cargo area 114, and then attached to pass-through connector 108B.

A second hook latch 102B has a second hook at one end and a second hole at the other end through which one end of a second hook latch strap 112D is fastened. The other end of the first hook latch strap 112D is fastened to a second cam-buckle 104B. One end of a second cam buckle strap 112B passes through the cam buckle 104B, then passes through pass-through connector 108B, forming one side of the single cargo area 114, and then attached to pass-through connector 108A.

The cargo area 114A is formed between the first cam buckle strap 112B and the second cam buckle strap 112C.

Figure 10:
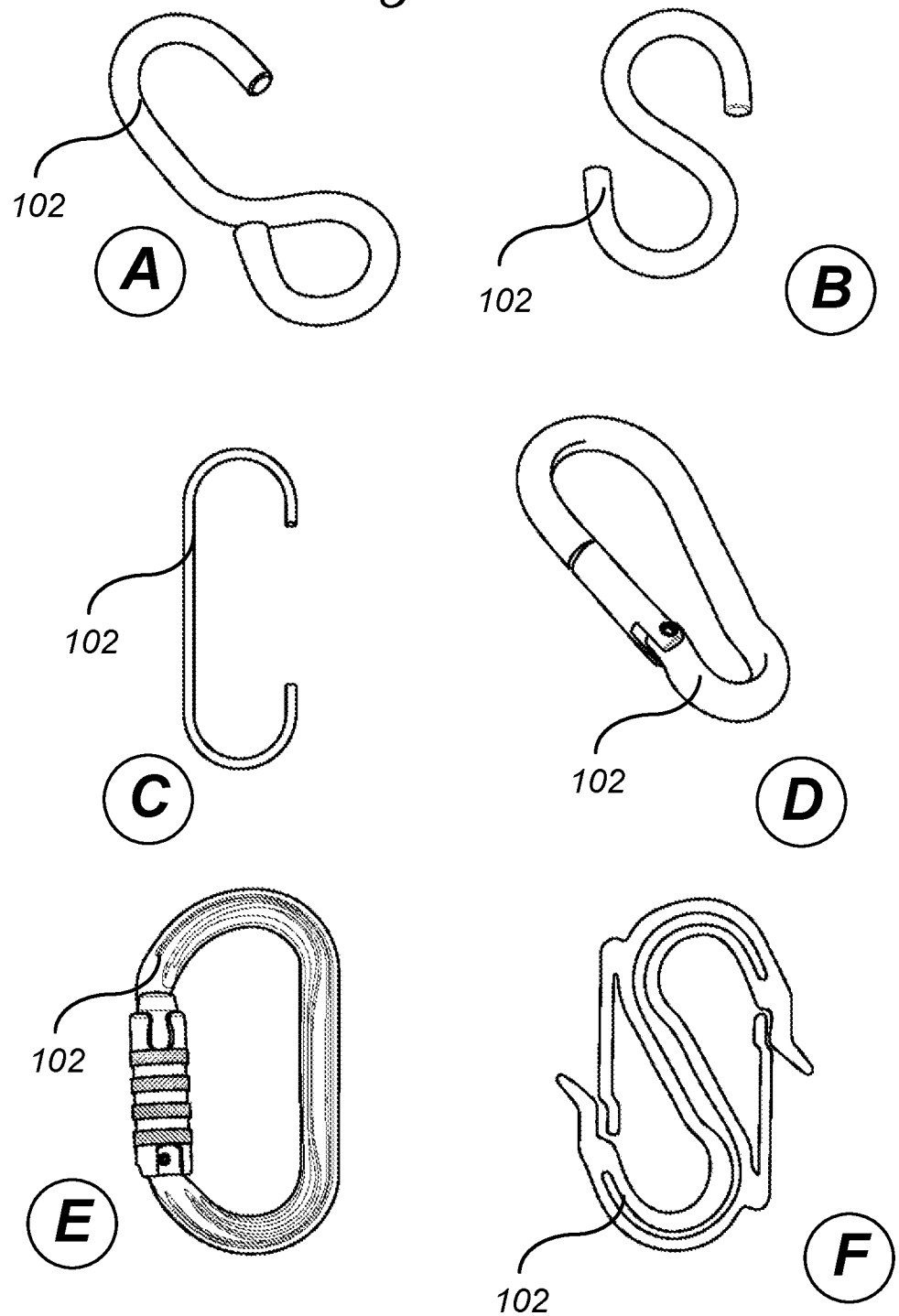
FIG. 10 illustrates examples of hook latches.

In an exemplary embodiment, and with reference to at least FIG. 10, at least one of the first hook latch 102A or the second hook latch 102B can be at least one of the following: a hook with one closed-end such as shown in reference 'A', an S-shaped hook such as shown in reference 'B', a C-shaped hook such as reference 'C', a carabiner such as in reference 'D', a locking carabiner such as reference 'E', a spring latch combination such as in reference 'F', or other types and kids of hook latches, as may be required and/or desired in a particular embodiment.

Referring to FIG. 2 there is illustrated one example of an adjustable cargo strap 100 having a single cargo area 114. In an exemplary embodiment, an adjustable cargo strap 100 comprises a first hook latch 102A having a first open end 122A, and a first hole end 120A. A first cam buckle 104A has a first closed-end 124A and a first pass-through end 126A. A first hook latch strap 112A has a first buckle end 128A that is fastened to the first closed-end 124A and a first hook end 130A that is fastened to the first hole end 120A. A second hook latch 102B has a second open end 122B and a second hole end 120B. A second cam buckle 104B has a second closed-end 124B and a second pass-through end 126B. A second hook latch strap 112D has a second buckle end 128B that is fastened to the second closed-end 124B and a second hook end 130B that is fastened to the second hole end 120B.

The adjustable cargo strap 100 further comprises a first pass-through connector 108A, a second pass-through connector 108B, and a first cam buckle strap 112B that has a first strap end 134A that is fastened to the second pass-through connector 108B and a first loose end 132A that passes through the first pass-through connector 108A and then passes through the first pass-through end 126A of the first cam buckle 104A. A second cam buckle strap 112B has a second strap end 134B that is fastened to the first pass-through connector 108A and a second loose end 132B that passes through the second pass-through connector 108B and then passes through the second pass-through end 126B. In this regard, a cargo area 114 for storing a cargo item, for example, and not a limitation cargo 206, 208, 210, 212, and other types and kinds of cargo as may be required and or desired in a particular embodiment, is formed between the first cam buckle strap 112A and the second cam buckle strap 112B.

In an exemplary embodiment, straps 112/118 ends can be fastened by wrapping around a pass-through connector 108, a cam buckle 104 closed-end 124, or other object and sewn to itself or otherwise secured to itself. In addition, the handle strap 118A, loop end 136 can be folded back and the lower portion sewn to itself or otherwise secured to itself to create the handle loop.

An advantage in the present invention, is that absent the cargo item in the cargo area 114 when the first cam buckle strap 112B and the second cam buckle strap 112C are tightened the first pass-through connector 108A and the second pass-through connector 108B are pulled together eliminating the cargo area and creating a uni-strap configuration allowing the adjustable cargo strap 100 to be used as a continuous strap.

In the present invention, the term "uni" such as in uni-strap is intended to mean one continuous piece or strap. In this regard, when the adjustable cargo strap 100 is configured by pulling the first pass-through connector 108A and the second pass-through connector 108B together the cargo area 114 between the first cam buckle strap 112B and the second cam buckle strap 112C is eliminated and a continuous single strap is formed which can be referred to as a uni-strap. In an exemplary embodiment, when there is more than one cargo area 114A-B, such as in FIG. 5, each of the cargo areas individually can be eliminated by pulling certain of the pass-through connectors together, such as 108A-B forming a uni-strap in the first cargo area 114A, and 108C-D forming a uni-strap in the second cargo area 114B.

Figure 3:
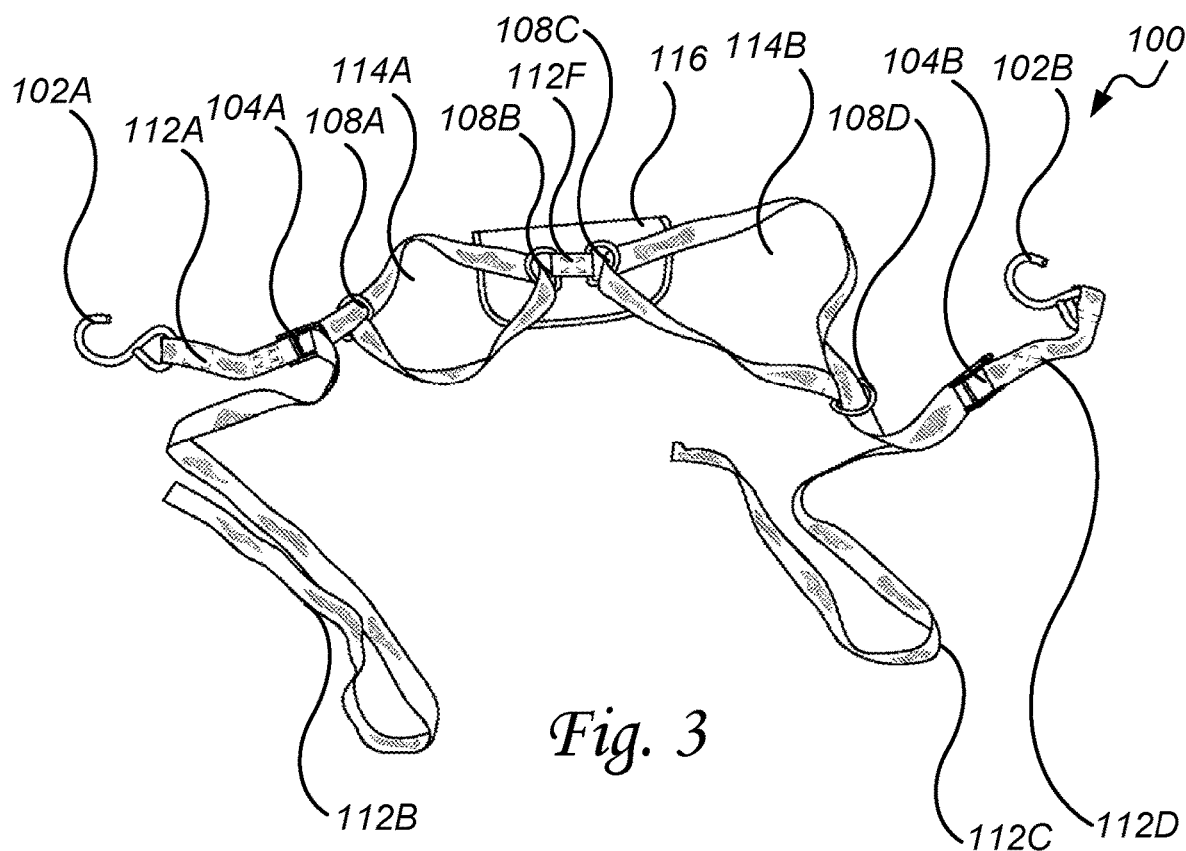
FIG. 3 illustrates one example of an adjustable cargo strap having two cargo areas.
Figure 4:
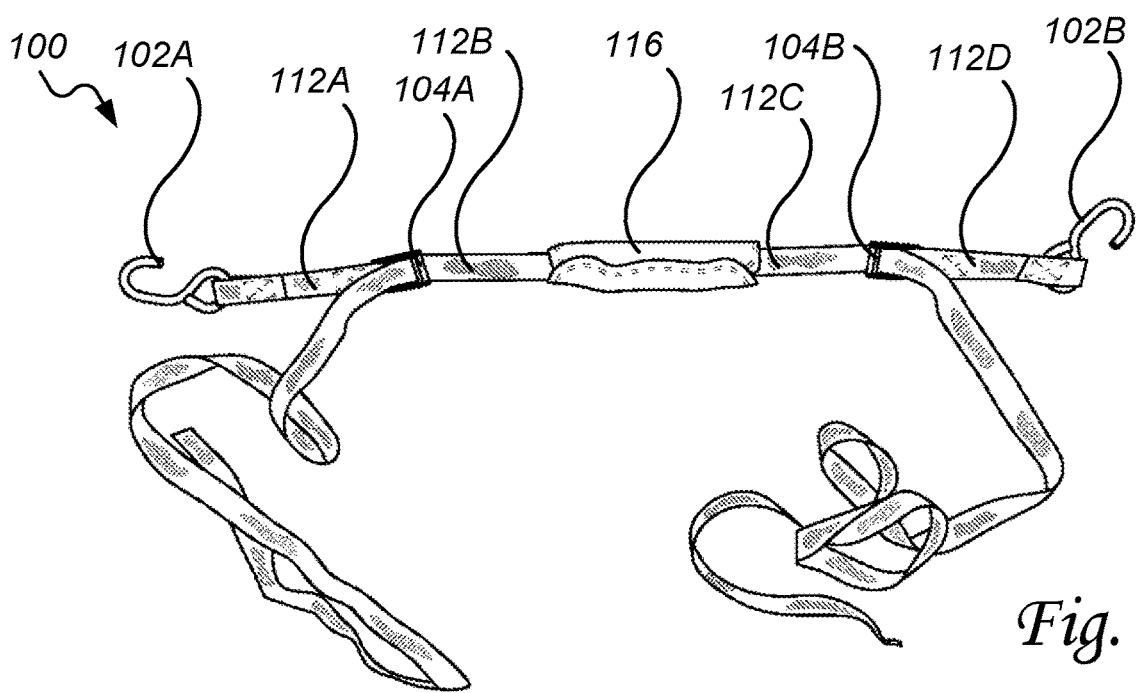
FIG. 4 illustrates one example of an adjustable cargo strap having stored pass-through connectors in a cover.

In an exemplary embodiment, as better illustrated in at least FIGS. 3 and 4, a cover 116 can be configured to wrap around each of the first pass-through connector 108A and the second pass-through connector 108B when pulled together forming a uni-strap configuration. Such cover 116 can also be used on a dual cargo area 114A-B adjustable cargo strap 100 as illustrated in at least FIG. 5 where the cover 116 wraps around connectors 108A-D.

In an exemplary embodiment, a first handle strap 118A has a first handle strap end 138A that is fastened to the first pass-through connector 108A and a first loop end 136A that forms a loop that a user 302 can hold. And, a second handle strap 118B has a second handle strap end 138B that is fastened to the second pass-through connector 108B, and a second loop end 136B that forms a loop the user 302 can hold. Such holding by the user 302 can include tugging to loosen or tighten the adjustable cargo strap 100, and holding for other purposes, as may be required and/or desired in a particular embodiment.

Figure 7:
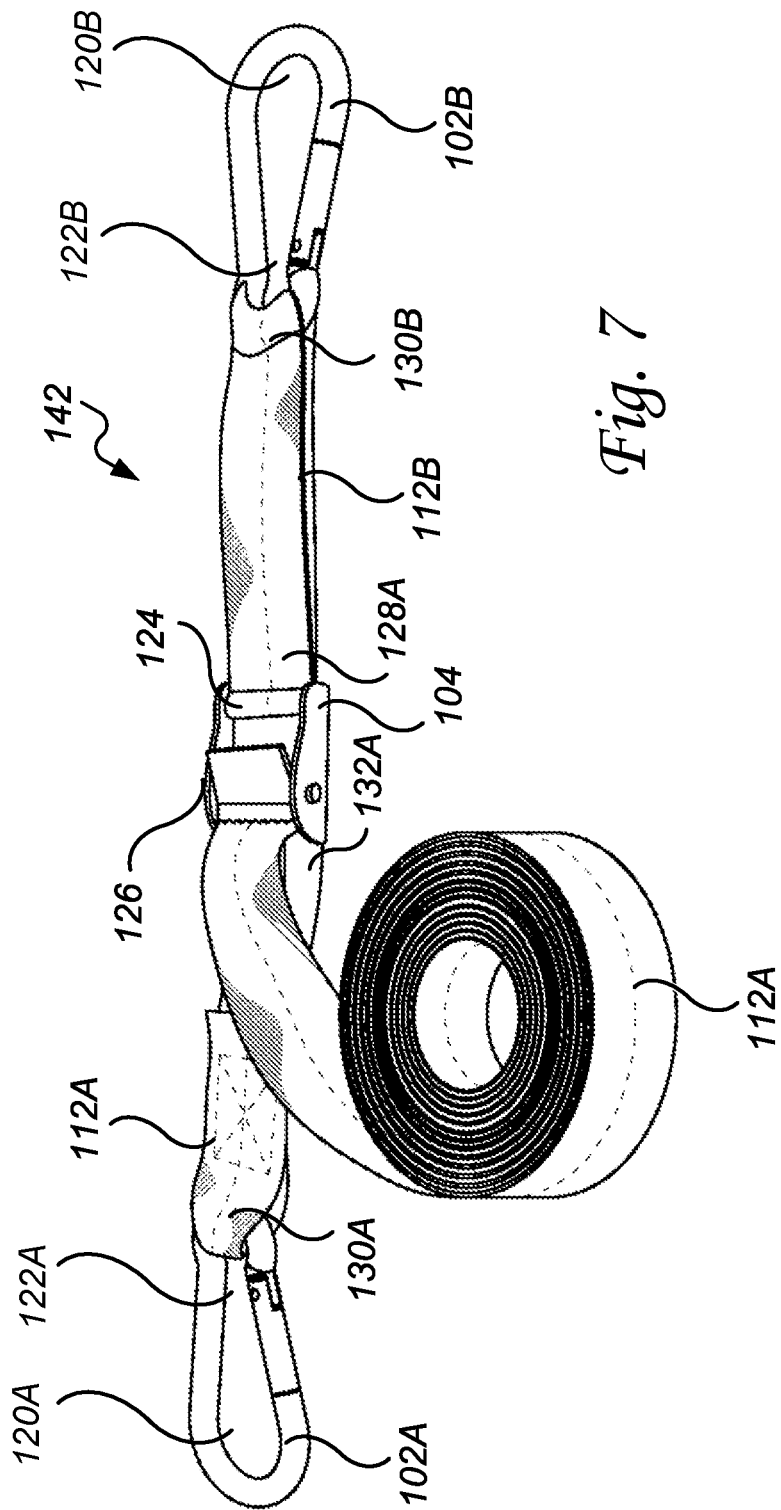
FIG. 7 illustrates one example of a connector strap.

In an exemplary embodiment, the cargo can be further secured from slipping out of cargo area 114 by use of a separate connector strap 142 which is better illustrated in at least FIG. 7 that is used in combination with the adjustable cargo strap 100. The connector strap 142 can traverse the cargo and connect to the adjustable cargo strap 100.

This additional connector strap 142 is intended to prevent cargo from slipping out of cargo area 114 (single cargo area adjustable cargo strap 100), or 114A or 114B (double cargo area adjustable cargo strap 100). In this regard, and with reference to at least FIG. 7, a hook latch 102B has an open end 120B and a hole end 122B. A cam buckle 104 has a closed-end 124 and a pass-through end 126. A hook latch strap 112B has a buckle end 128A that is fastened to the closed-end 124 and a hook end 130B that is fastened to the hole end 122B. A hook latch 102A has an open end 120A and a hole end 122A. A cam buckle strap 112A has a strap end 130A that is fastened to the hole end 122A and a loose end 132A that passes through the pass-through end 126. In operation, the hook latch strap 112B in combination with the cam buckle strap 112A traverses the cargo item, holding the cargo item from slipping out of the cargo area 114. The hook latch 102A and the hook latch 102B attach to the adjustable cargo strap 100. One or more connector strap 142 can be used with the adjustable cargo strap 100, as may be required and/or desired in a particular embodiment.

In an exemplary embodiment, and with reference to at least FIG. 10, at least one of the first hook latch 102A or the second hook latch 102B can be at least one of the following: a hook with one closed-end such as shown in reference 'A', an S-shaped hook such as shown in reference 'B', a C-shaped hook such as reference 'C', a carabiner such as in reference 'D', a locking carabiner such as reference 'E', a spring latch combination such as in reference 'F', or other types and kids of hook latches, as may be required and/or desired in a particular embodiment.

In an exemplary embodiment, the pass-through connectors 108A-D can be made of steel. In addition, the pass-through connector 108A-D can be powder-coated.

Referring to FIG. 3, there is illustrated one example of an adjustable cargo strap 100 having two cargo areas 114A-B. In an exemplary embodiment, a first hook latch 102A has a first hook at one end and a first hole at the other end through which one end of a first hook latch strap 112A is fastened. The other end of the first hook latch strap 112A is fastened to a first cam-buckle 104A. One end of a first cam buckle strap 112B passes through the cam buckle 104A, then passes through pass-through connector 108A, then forms one side of the cargo area 114A, then passes through pass-through connector 108B, then forms the other side of the cargo area 114A, and then returns to be terminated by being attached to pass-through connector 108A.

A second hook latch 102B has a second hook at one end and a second hole at the other end through which one end of a second hook latch strap 112D is fastened. The other end of the second hook latch strap 112D is fastened to a second cam-buckle 104B. One end of a second cam buckle strap 112C passes through the cam buckle 104B, passes then through pass-through connector 108D, then forms one side of the cargo area 114B, then passes through pass-through connector 108C, then forms the other side of the cargo area 114B, and then returns to be terminated by being attached to pass-through connector 108B.

Pass-through connectors 108B and 108C are connected by way of a short connector strap 112E. A cover 116 can be attached to the strap proximate to the pass-through connectors 108B and 108C.

The first cargo area 114A is formed by way of the first cam buckle strap 112B. The second cargo area 114B is formed by way of the second cam buckle strap 112C.

In an exemplary embodiment, and with reference to at least FIG. 10, at least one of the first hook latch 102A or the second hook latch 102B can be at least one of the following: a hook with one closed-end such as shown in reference 'A', an S-shaped hook such as shown in reference 'B', a C-shaped hook such as reference 'C', a carabiner such as in reference 'D', a locking carabiner such as reference 'E', a spring latch combination such as in reference 'F', or other types and kids of hook latches, as may be required and/or desired in a particular embodiment.

Referring to FIG. 4, there is illustrated one example of an adjustable cargo strap 100 having stored pass-through connectors 108A-D (visible in FIG. 3, not visible in FIG. 4) in a cover 116. In an exemplary embodiment, when user 302 wants to use the adjustable cargo strap 100 without the cargo areas 114(single cargo area)/114A-B(double cargo area), the pass-through connectors 108 can be slid together by pulling each end of the strap causing the cargo areas 114/114A-B to collapse to nothing. In this regard, the pass-through connectors 108 can be co-located and the cover 116 closed around them. The adjustable cargo strap 100 can then be used as a traditional style strap also referred to as a uni-strap.

Cover 116 can be made of fabric or other material and wrap around the portion of the strap where the pass-through connectors 108 are co-located. The cover 116 can be closed or otherwise fastened around the pass-through connectors by way of hook and loop, zipper, snaps, button, or other types and kinds of fasteners, as may be required and/or desired in a particular embodiment.

Referring to FIG. 5, there is illustrated one example of an adjustable cargo strap 100 having two cargo areas 114A-B. In an exemplary embodiment, an adjustable cargo strap 100 comprises a first hook latch 102A having a first open end 122A and a first hole end 120A. A first cam buckle 104A has a first closed-end 124A and a first pass-through end 126A. A first hook latch strap 112A has a first cam buckle end 128A that is fastened to the first closed-end 124A and a first hook end 130A that is fastened to the first hole end 120A. A second hook latch 102B has a second open end 122B and a second hole end 120B. A second cam buckle 104B has a second closed-end 124B and a second pass-through end 126B. A second hook latch strap 112D has a second cam buckle end 128A that is fastened to the second closed-end 124B and a second hook end 130B that is fastened to the second hole end 120B.

The adjustable cargo harness 100 further comprises a first pass-through connector 108B, a second pass-through connector 108C, and a connector strap 112F having a first connector end 140A fastened to the first pass-through connector 108B and a second connector end 140B fastened to the second pass-through connector 108C.

The adjustable cargo harness 100 further comprises a third pass-through connector 108A, a fourth pass-through connector 108D, and a first cam buckle strap 112B having a first strap end 134A that is fastened to the third pass-through connector 108A and a first loose end 132A that passes through the first pass-through connector 108B and then passes through the third pass-through connector 108A and then passes through the first pass-through end 126A. And, a second cam buckle strap 112C has a second strap end 134B that is fastened to the fourth pass-through connector 108D and a second loose end 132B that passes through the second pass-through connector 108C and then passes through the fourth pass-through connector 108D and then passes through the second pass-through end 126B.

In operation, a first cargo area 114A for storing a first cargo item is formed between the first cam buckle strap 112B, the first pass-through connector 108B, and the third pass-through connector 108A. And, a second cargo area 114B for storing a second cargo item is formed between the second cam buckle strap 112C, the second pass-through connector 108C, and the fourth pass-through connector 108D. Cargo items can be, for example, and not a limitation cargo 206, 208, 210, 212, and other types and kinds of cargo, as may be required and or desired in a particular embodiment.

In an exemplary embodiment, straps 112/118 ends can be fastened by wrapping around a pass-through connector 108, a cam buckle 104 closed-end 124, or other object and sewn to itself or otherwise secured to itself. In addition, the handle strap 118A, loop end 136 can be folded back and the lower portion sewn to itself or otherwise secured to itself to create the handle loop.

In an exemplary embodiment, and with reference to at least FIG. 10, at least one of the first hook latch 102A or the second hook latch 102B can be at least one of the following: a hook with one closed-end such as shown in reference 'A', a S-shaped hook such as shown in reference 'B', a C-shaped hook such as reference 'C', a carabiner such as reference 'D', a locking carabiner such as reference 'E', a spring latch combination such as in reference 'F', or other types and kids of hook latches, as may be required and/or desired in a particular embodiment.

In an exemplary embodiment, the pass-through connectors 108A-D can be made of steel. In addition, the pass-through connector 108A-D can be powder-coated.

An advantage in the present invention, is that absent the first cargo item in the first cargo 114A when the first cam buckle strap 112B is tightened the first pass-through connector 108B and the third pass-through connector 108A are pulled together a uni-strap configuration is formed across the first cargo area 114A, and absent the second cargo item in the second cargo area 114B when the second cam buckle strap 112C is tightened the second pass-through connector 108C and the fourth pass-through connector 108D are pulled together a uni-strap configuration is formed across the second cargo area 114B.

Figure 6:
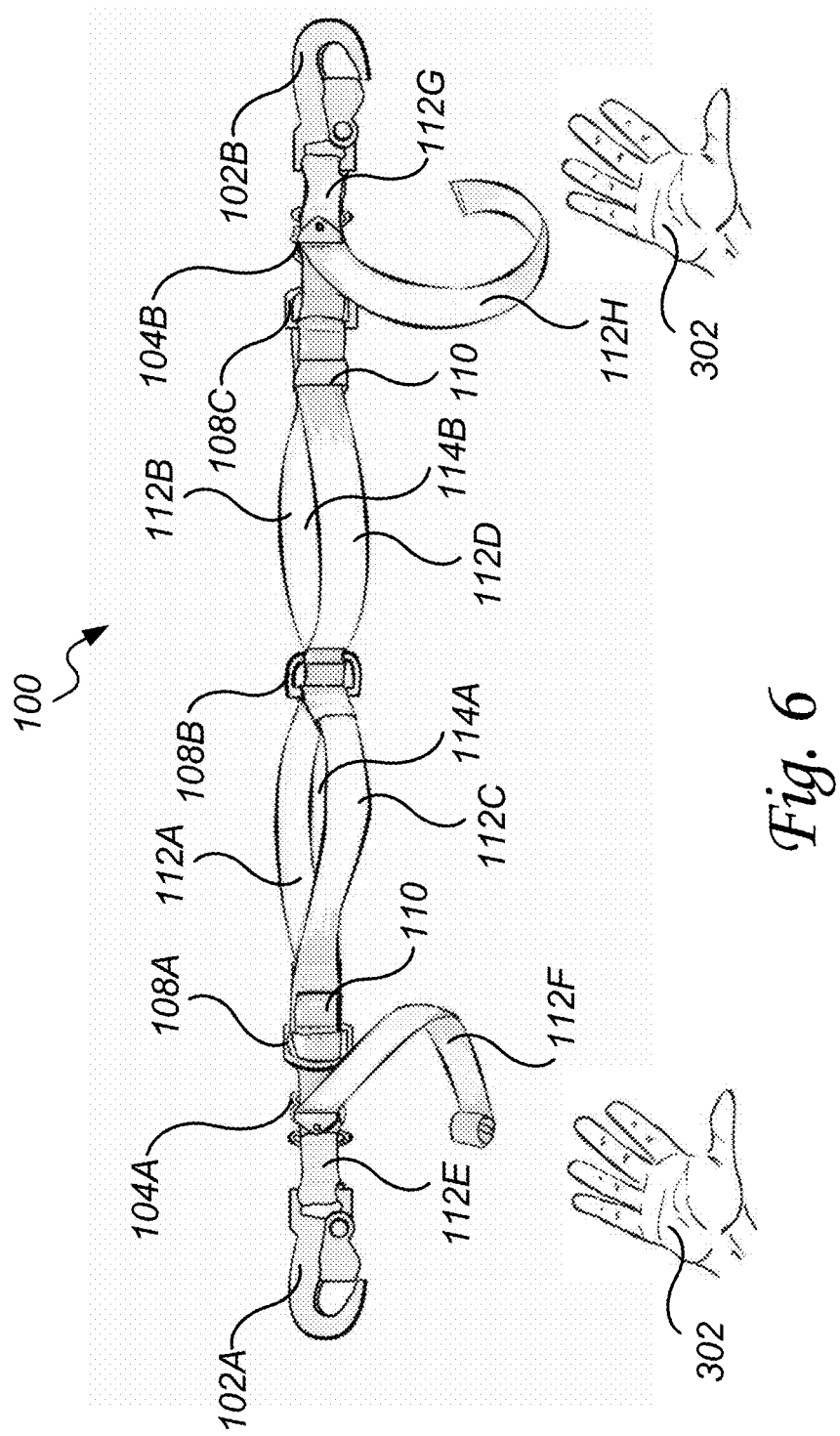
FIG. 6 illustrates one example of an adjustable cargo strap having two cargo areas.

Referring to FIG. 6, there is illustrated one example of an adjustable cargo strap 100 having two cargo areas 114A-B. In an exemplary embodiment, a first hook latch 102A has a first hook at one end and a first hole at the other end through which one end of a first hook latch strap 112E is fastened. The other end of the first hook latch strap 112E is fastened to a first cam-buckle 104A. One end of a first cam buckle strap 112F is fastened to and passes through a first pass-through connector 108. The first cam buckle strap illustrated as 112A continues forming one side of a first cargo area 114A fastens to and passes through a second pass-through connector 108B. The first cam buckle strap illustrated as 112B continues forming one side of a second cargo area 114B. The first cam buckle strap 112B then terminates by fastening to a third pass-through connector 108C.

A second hook latch 102B has a second hook at one end and a second hole at the other end through which one end of a second hook latch strap 112G is fastened. The other end of the first hook latch strap 112G is fastened to a second cam-buckle 104B. One end of a second cam buckle strap 112H is fastened to and passes through the third pass-through connector 108C. The second cam buckle strap illustrated as 112D continues forming one side of the second cargo area 114B, fastens to and passes through the second pass-through connector 108B. The second cam buckle strap illustrated as 112C continues forming one side of the first cargo area 114A. The second cam buckle strap 112C then terminates by fastening to the first pass-through connector 108A.

The first cargo area 114A is formed between the first cam buckle strap 112A and the second cam buckle strap 112C. The second cargo area 114B is formed between the first cam buckle strap 112B and the second cam buckle strap 112D.

A first belt loop 110 encircles the cam buckle straps 112B and 112D and is slidable between the second pass-through connector 108B and the third pass-through connector 108C. Optionally, a second belt loop can encircle the cam buckle straps 112A and 112C and is slidable between the first pass-through connector 108A and the second pass-through connector 108B. The belt loops 110 serve to change the size of the cargo area between the cam buckle straps as well as keep the cam straps 112B and 112D together and resistant to flapping in the wind when there is no cargo being carried in one or more of the cargo areas 114A or 114B.

In an exemplary embodiment, and with reference to FIG. 10, there are illustrated examples of hook latches 102. In an exemplary embodiment, at least one of the first hook latch 102A or the second hook latch 102B can be at least one of the following: a hook with one closed-end such as shown in reference 'A', an S-shaped hook such as shown in reference 'B', a C-shaped hook such as reference 'C', a carabiner such as in reference 'D', a locking carabiner such as reference 'E', a spring latch combination such as in reference 'F', or other types and kids of hook latches, as may be required and/or desired in a particular embodiment.

Referring to FIG. 7, there is illustrated one example of a connector strap 142. In an exemplary embodiment, the cargo can be further secured from slipping out of cargo area 114 by use of a separate connector strap 142 that is used in combination with the adjustable cargo strap 100. The connector strap 142 can traverse the cargo and connect to the adjustable cargo strap 100.

This additional connector strap 142 is intended to prevent cargo from slipping out of cargo area 114 (single cargo area adjustable cargo strap 100), or 114A or 114B (double cargo area adjustable cargo strap 100). In this regard, and with reference to at least FIG. 7, a hook latch 102B has an open end 120B and a hole end 122B. A cam buckle 104 has a closed-end 124 and a pass-through end 126. A hook latch strap 112B has a buckle end 128A that is fastened to the closed-end 124 and a hook end 130B that is fastened to the hole end 122B. A hook latch 102A has an open end 120A and a hole end 122A. A cam buckle strap 112A has a strap end 130A that is fastened to the hole end 122A and a loose end 132A that passes through the pass-through end 126. In operation, the hook latch strap 112B in combination with the cam buckle strap 112A traverses the cargo item, holding the cargo item from slipping out of the cargo area 114. The hook latch 102A and the hook latch 102B attach to the adjustable cargo strap 100. One or more connector strap 142 can be used with the adjustable cargo strap 100, as may be required and/or desired in a particular embodiment.

Figure 8:
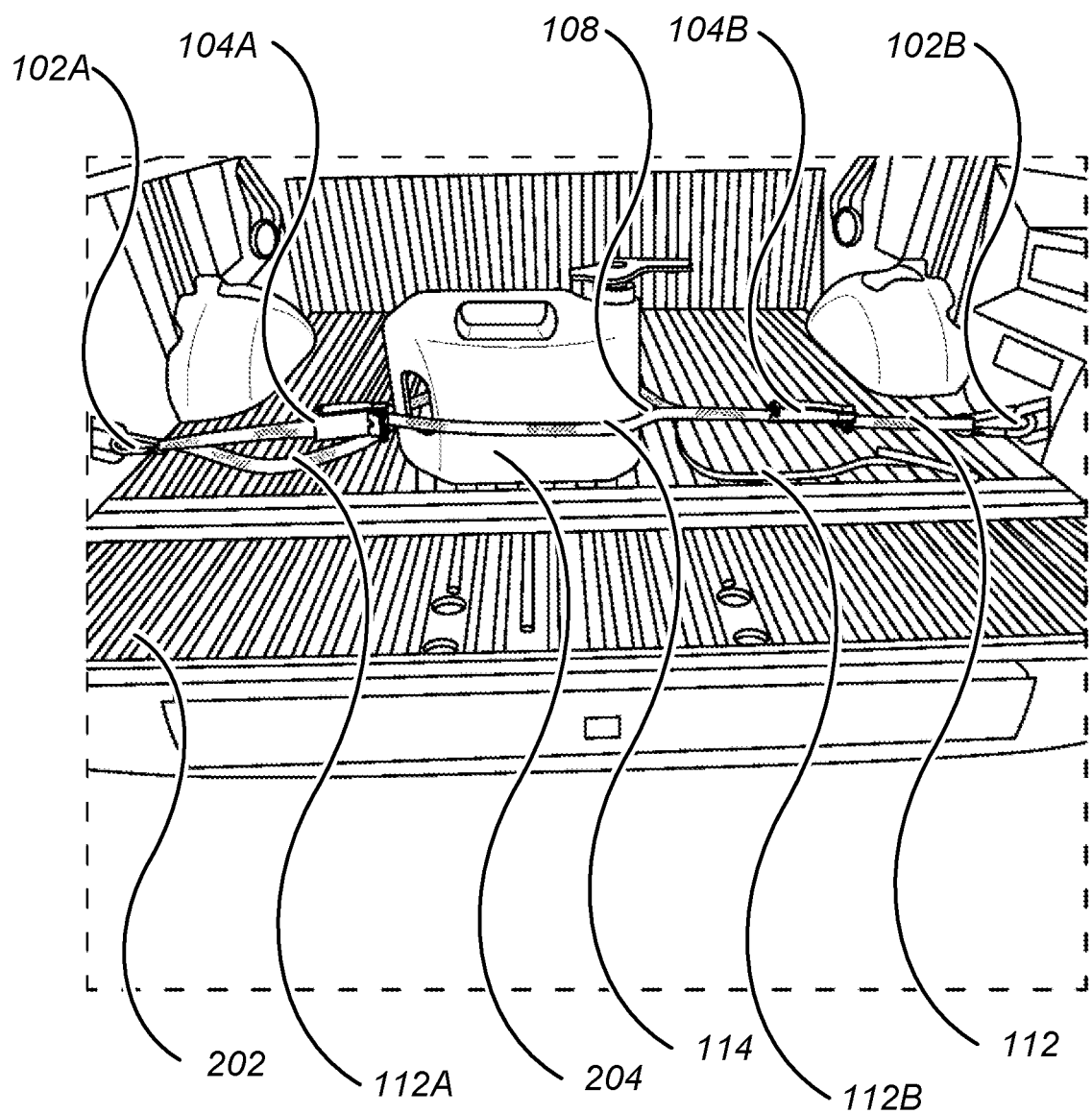
FIG. 8 illustrates one example of an odd-sized cargo being secured in a truck bed.

Referring to FIG. 8, there is illustrated one example of odd-sized cargo being secure in a truck bed. In an exemplary embodiment, in operation, a user 302 can secure a first hook latch 102A and a second hook latch 102B between the opening of a truck bed 202. Cargo item 204 can be placed into one of the cargo areas 114. The loose ends of the cam buckle strap 112A and 112B can be pulled to remove any slack in the straps and snugly tighten the adjustable cargo strap 100 around the cargo 204. Each of the cam buckles 104A and 104B can then be adjusted in ratchet-style or pull-and-grip style by user 302 to increase the force on the strap causing the cargo areas 114 to be constricted around and secure the cargo 204.

To release the tension on the adjustable cargo strap 100, one or both cam buckles 102A and 102B can be opened in a manner that releases the locking ratchet holding tension on the straps. The adjustable cargo strap can then be loosened by stretching the cam buckle 104A or 104B in a manner that causes the cam buckle to rotate in a backward direction or otherwise release the straps 112A or 112B, allowing the straps 112A or 112B to egress from the cam buckle 104A or 104B.

In an exemplary embodiment, with or with cargo stored in one or both the cargo areas 114A and 114B, the adjustable cargo strap can be used to secure an area such as by not allowing objects to slide out the back of a truck bed, or lash across a load preventing slippage or sliding of objects being hauled.

Figure 9:
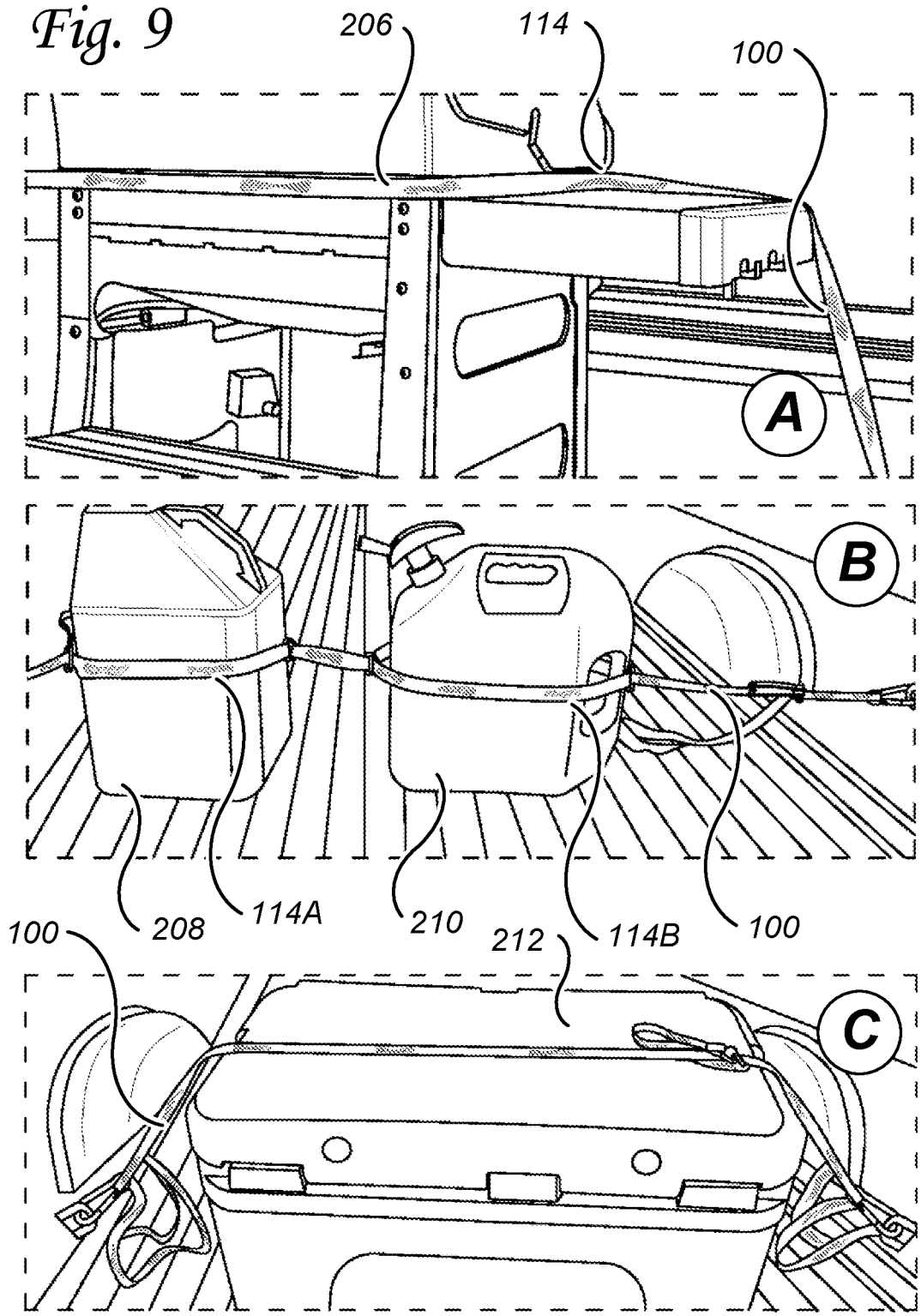
FIG. 9 illustrates exemplary embodiments of an adjustable cargo strap.

Referring to FIG. 9, there are illustrated exemplary embodiments of an adjustable cargo strap 100. Cargo items can be, for example, and not a limitation cargo 206, 208, 210, 212, and other types and kinds of cargo, as may be required and or desired in a particular embodiment.

In one exemplary embodiment, for example, and not a limitation reference 'A' illustrates a single cargo area 114 adjustable cargo strap 100, wherein a barbeque 206 is the cargo item inside the cargo area 114 being secured by the adjustable cargo strap 100.

In one exemplary embodiment, for example, and not a limitation reference 'B' illustrates a double cargo area 114A-B adjustable cargo strap 100, wherein the first cargo area 114A is securing a bottle and the second cargo area 114A is securing a gas can.

In one exemplary embodiment, for example, and not a limitation reference 'C' illustrates, and with reference to at least FIG. 2, in the case that a single cargo area adjustable cargo strap 100 is absent any cargo item in the cargo area 114 when the first cam buckle strap 112B and the second cam buckle strap 112C are tightened the first pass-through connector 108A and the second pass-through connector 108B are pulled together forming a uni-strap configuration.

In another exemplary embodiment, for example, and not a limitation reference 'C' illustrates, and with reference to at least FIG. 5, in the case that a double cargo area adjustable cargo strap 100 is absent the first cargo item in the first cargo area 114A when the first cam buckle strap 112B is tightened the first pass-through connector 108A and the third pass-through connector 108B are pulled together forming a uni-strap configuration across the first cargo area 114A. And, absent the second cargo item in the second cargo area 114B when the second cam buckle strap 112C is tightened the second pass-through connector 108D and the fourth pass-through connector 108C are pulled together forming a uni-strap configuration across the second cargo area 114B.

Referring to FIG. 10, there are illustrated examples of hook latches 102. In an exemplary embodiment, at least one of the first hook latch 102A or the second hook latch 102B can be at least one of the following a hook with one closed-end such as shown in reference 'A', an S-shaped hook such as shown in reference 'B', a C-shaped hook such as reference 'C', a carabiner such as in reference 'D', a locking carabiner such as reference 'E', a spring latch combination such as in reference 'F', or other types and kids of hook latches, as may be required and/or desired in a particular embodiment.

Referring to FIG. 11, there is illustrated one example of a method of using an adjustable cargo strap 100. In an exemplary embodiment, the method begins in step 1002 by expanding at least one of a cargo area 114 to fit around at least one of a cargo item by way of a single cargo area 114 adjustable cargo strap 100 as better illustrated in at least FIG. 2, or a double cargo area 114A and 114B adjustable cargo strap as better illustrated in at least FIG. 5. Such cargo items can be for example and not a limitation cargo 206, 208, 210, 212, and other types and kinds of cargo, as may be required and or desired in a particular embodiment.

The adjustable cargo strap 100 has a single cargo area 114 comprising a first hook latch 102A having a first open end 122A and a first hole end 120A. A first cam buckle 104A has a first closed-end 124A and a first pass-through end 126A. A first hook latch strap 112A has a first buckle end 128A that is fastened to the first closed-end 124A and a first hook end 130A that is fastened to the first hole end 120A. A second hook latch 102B has a second open end 122B and a second hole end 120B. A second cam buckle 102B has a second closed-end 124B and a second pass-through end 126B. A second hook latch strap 112D has a second buckle end 128B that is fastened to the second closed-end 124B and a second hook end 130B that is fastened to the second hole end 120B.

The adjustable cargo strap 100 having a single cargo area 114 further comprises a first pass-through connector 108A, a second pass-through connector 108B, a first cam buckle strap 112B having a first strap end 134A that is fastened to the second pass-through connector 108B and a first loose end 132A that passes through the first pass-through connector 108A and then passes through the first pass-through end 126A. And a second cam buckle strap 112C has a second strap end 134B that is fastened to the first pass-through connector 108A and a second loose end 132B that passes through the second pass-through connector 108A and then passes through the second pass-through end 126B. In operation, a cargo area 114 for storing a cargo item is formed between the first cam buckle strap 112B and the second cam buckle strap 112C.

Or, the adjustable cargo strap 100 has a double cargo area 114 comprising the first hook latch 102A having the first open end 122A and the first hole end 120A. The first cam buckle 104A has the first closed-end 124A and the first pass-through end 126A. The first hook latch strap 112A has the first cam buckle end 128A that is fastened to the first closed-end 124A and the first hook end 130A that is fastened to the first hole end 120A. The second hook latch 102B has the second open end 122B and the second hole end 120B. The second cam buckle 104B has the second closed-end 124B and the second pass-through end 126B. The second hook latch strap 112D has the second cam buckle end 128B that is fastened to the second closed-end 124B and the second hook end 130B that is fastened to the second hole end 120B.

The adjustable cargo strap 100 having double cargo areas 114A-B further comprises the first pass-through connector 108B, and the second pass-through connector 108C. A connector strap 112F has a first connector end 140A fastened to the first pass-through connector 108B and a second connector end 140B fastened to the second pass-through connector 108C.

The adjustable cargo strap 100 having double cargo areas 114A-B further comprises a third pass-through connector 108A, and a fourth pass-through connector 108D, the first cam buckle strap 112B has a first strap end 134A that is fastened to the third pass-through connector 108A, and the first loose end 132A that passes through the first pass-through connector 108B and then passes through the third pass-through connector 108A and then passes through the first pass-through end 126A. And, the second cam buckle strap 112C has the second strap end 134B that is fastened to the fourth pass-through connector 108D and the second loose end 132B that passes through the second pass-through connector 108C and then passes through the fourth pass-through connector 108D and then passes through the second pass-through end 126B.

In operation, the first cargo area 114A is for storing a first cargo item and is formed between the first cam buckle strap 112B, the first pass-through connector 108B, and the third pass-through connector 108A. A second cargo area 114B for storing a second cargo item is formed between the second cam buckle strap 112C, the second pass-through connector 108C, and the fourth pass-through connector 108D. The method then moves to step 1004.

In step 1004, the first hook latch and the second hook latch are secured to a rigid structure. The method then moves to step 1006.

In step 1006, by way of the first cam buckle, the first hook latch strap tightened, and by way of the second cam buckle, the second hook latch strap tightened. The method is then exited.

While the preferred embodiment of the invention has been described, it will be understood that those skilled in the art, both now and in the future, may make various improvements and enhancements.

What is claimed is:

1. An adjustable cargo strap comprising:
   a first hook latch having a first open end and a first hole end;
   a first cam buckle having a first closed-end and a first pass-through end;
   a first hook latch strap having a first buckle end that is fastened to the first closed-end and a first hook end that is fastened to the first hole end;
   a second hook latch having a second open end and a second hole end;
   a second cam buckle having a second closed-end and a second pass-through end;
   a second hook latch strap having a second buckle end that is fastened to the second closed-end and a second hook end that is fastened to the second hole end;
   a first pass-through connector;
   a second pass-through connector;
   a first cam buckle strap having a first strap end that is fastened to the second pass-through connector and a first loose end that passes through the first pass-through connector and then passes through the first pass-through end; and
   a second cam buckle strap having a second strap end that is fastened to the first pass-through connector and a second loose end that passes through the second pass-through connector and then passes through the second pass-through end;
   a first handle strap having a first handle strap end fastened to the first pass-through connector and a first loop end;
   a second handle strap having a second handle strap end fastened to the second pass-through connector and a second loop end;
   wherein the first cam buckle strap and the second cam buckle strap crisscross between the first pass-through connector and the second pass-through connector to define a cargo area configured to receive a cargo item;
   wherein the cargo area is suspended between the first hook latch and the second hook latch without requiring contact with a supporting surface; and
   wherein, in the absence of the cargo item, tightening the first and second cam buckle straps draws the first and second pass-through connectors toward one another to form a uni-strap configuration.

2. The adjustable cargo strap in accordance with claim 1, wherein at least one of the first hook latch or the second hook latch is at least one of the following: a hook with one closed-end, an S-shaped hook, a C-shaped hook, a carabiner, a locking carabiner, or a spring latch combination.

3. The adjustable cargo strap in accordance with claim 1, wherein at least one of the first pass-through connector or the second pass-through connector is made of steel.

4. The adjustable cargo strap in accordance with claim 1, wherein at least one of the first pass-through connector, or the second pass-through connector is powder-coated.

5. The adjustable cargo strap in accordance with claim 1, wherein at least one of the first hook latch strap, the second hook latch strap, the first cam buckle strap, or the second cam buckle strap is made from at least one of the following: wire rope, braided fiber, rope, or polyester webbing.

6. The adjustable cargo strap in accordance with claim 1, further comprising a connector strap having opposing ends coupled to the adjustable cargo strap and configured to traverse the cargo area to prevent lateral movement of a cargo item positioned within the cargo area.

7. The adjustable cargo strap in accordance with claim 1, wherein in the uni-strap configuration, the adjustable cargo strap is configured to remain attached between the first hook latch and the second hook latch for stowage or re-use without removal from anchor points.

8. The adjustable cargo strap in accordance with claim 1, further comprising:
   a first handle strap having a first handle strap end fastened to the first pass-through connector and a first loop end for a user to hold; and
   a second handle strap having a second handle strap end fastened to the second pass-through connector and a second loop end for the user to hold;
   wherein the first and second handle straps are configured to be pulled to draw the first and second pass-through connectors toward one another and apply tension to the cam buckle straps.

9. The adjustable cargo strap in accordance with claim 1, further comprising:
   a cover configured to enclose the first pass-through connector and the second pass-through connector when the adjustable cargo strap is in the uni-strap configuration.

10. The adjustable cargo strap in accordance with claim 1, further comprising:
    a connector strap, the connector strap comprises:
      a third hook latch having a third open end and a third hole end;
      a third cam buckle having a third closed-end and a third pass-through end;
      a third hook latch strap having a third buckle end that is fastened to the third closed-end and a third hook end that is fastened to the third hole end;
      a fourth hook latch having a fourth open end and a fourth hole end; and
      a fourth cam buckle strap having a fourth strap end that is fastened to the fourth hole end and a third loose end that passes through the third pass-through end;
    wherein the connector strap traverses the cargo item thereby preventing the cargo item from slipping out of the cargo area, the third hook latch and the fourth hook latch attach to the adjustable cargo strap.

11. An adjustable cargo strap comprising:
    a first hook latch having a first open end and a first hole end;
    a first cam buckle having a first closed-end and a first pass-through end;
    a first hook latch strap having a first cam buckle end that is fastened to the first closed-end and a first hook end that is fastened to the first hole end;
    a second hook latch having a second open end and a second hole end;
    a second cam buckle having a second closed-end and a second pass-through end;
    a second hook latch strap having a second cam buckle end that is fastened to the second closed-end and a second hook end that is fastened to the second hole end;
    a first pass-through connector;

a second pass-through connector;
a connector strap having a first connector end fastened to the first pass-through connector and a second connector end fastened to the second pass-through connector;
a third pass-through connector;
a fourth pass-through connector;
a first cam buckle strap having a first strap end that is fastened to the third pass-through connector and a first loose end that passes through the first pass-through connector and then passes through the third pass-through connector and then passes through the first pass-through end; and
a second cam buckle strap having a second strap end that is fastened to the fourth pass-through connector and a second loose end that passes through the second pass-through connector and then passes through the fourth pass-through connector and then passes through the second pass-through end;
wherein a first cargo area for storing a first cargo item is formed between the first cam buckle strap, the first pass-through connector, and the third pass-through connector; and
wherein a second cargo area for storing a second cargo item is formed between the second cam buckle strap, the second pass-through connector, and the fourth pass-through connector.

12. The adjustable cargo strap in accordance with claim 11, wherein at least one of the first hook latch or the second hook latch is at least one of the following: a hook with one closed-end, an S-shaped hook, a C-shaped hook, a carabiner, a locking carabiner, or a spring latch combination.

13. The adjustable cargo strap in accordance with claim 11, wherein at least one of the first pass-through connector or the second pass-through connector is made of steel.

14. The adjustable cargo strap in accordance with claim 11, wherein at least one of the first pass-through connector, or the second pass-through connector is powder-coated.

15. The adjustable cargo strap in accordance with claim 11, wherein at least one of the first hook latch strap, the second hook latch strap, the first cam buckle strap, or the second cam buckle strap is made from at least one of the following wire rope, braided fiber, rope, or polyester webbing.

16. The adjustable cargo strap in accordance with claim 11, wherein absent the first cargo item in the first cargo area when the first cam buckle strap is tightened the first pass-through connector and the third pass-through connector are pulled together forming a uni-strap configuration across the first cargo area, and absent the second cargo item in the second cargo area when the second cam buckle strap is tightened the second pass-through connector and the fourth pass-through connector are pulled together forming a uni-strap configuration across the second cargo area.

17. The adjustable cargo strap in accordance with claim 11, further comprising:
a cover configured to enclose the first pass-through connector and the second pass-through connector when the adjustable cargo strap is in the uni-strap configuration.

18. The adjustable cargo strap in accordance with claim 11, further comprising:
a connector strap, the connector strap comprises:
a third hook latch having a third open end and a third hole end;
a third cam buckle having a third closed-end and a third pass-through end;
a third hook latch strap having a third buckle end that is fastened to the third closed-end and a third hook end that is fastened to the third hole end;
a fourth hook latch having a fourth open end and a fourth hole end; and
a fourth cam buckle strap having a fourth strap end that is fastened to the fourth hole end and a third loose end that passes through the third pass-through end;
wherein the connector strap traverses at least one of the first cargo or the second cargo items thereby preventing either the first cargo item or the second cargo item from slipping out of either the first cargo area, or the second cargo area, the third hook latch and the fourth hook latch attach to the adjustable cargo strap.

19. The adjustable cargo strap in accordance with claim 11, further comprising:
a first handle strap having a first handle strap end that is fastened to the first pass-through connector and a first loop end for a user to hold; and
a second handle strap having a second handle strap end that is fastened to the second pass-through connector and a second loop end for the user to hold;
wherein, the user by way of the first handle strap and the second handle strap tightens or loosens the adjustable cargo strap.

20. A method of using an adjustable cargo strap comprising the steps of:
expanding at least one of a cargo area to fit around at least one of a cargo item by way of:
the adjustable cargo strap having a single cargo area, the adjustable cargo strap comprising a first hook latch having a first open end and a first hole end, a first cam buckle having a first closed-end and a first pass-through end, a first hook latch strap having a first buckle end that is fastened to the first closed-end and a first hook end that is fastened to the first hole end, a second hook latch having a second open end and a second hole end, a second cam buckle having a second closed-end and a second pass-through end, a second hook latch strap having a second buckle end that is fastened to the second closed-end and a second hook end that is fastened to the second hole end, a first pass-through connector, a second pass-through connector, a first cam buckle strap having a first strap end that is fastened to the second pass-through connector and a first loose end that passes through the first pass-through connector and then passes through the first pass-through end, and a second cam buckle strap having a second strap end that is fastened to the first pass-through connector and a second loose end that passes through the second pass-through connector and then passes through the second pass-through end, wherein a cargo area for storing a cargo item is formed between the first cam buckle strap and the second cam buckle strap; or
the adjustable cargo strap having a double cargo area, the adjustable cargo strap comprising the first hook latch having the first open end and the first hole end, the first cam buckle having the first closed-end and the first pass-through end, the first hook latch strap having the first cam buckle end that is fastened to the first closed-end and the first hook end that is fastened to the first hole end, the second hook latch having the second open end and the second hole end, the second cam buckle having the second closed-end and the second pass-through end, the second hook latch strap having the second cam buckle end that is fastened to the second closed-end and the second hook end that is fastened to the second hole end, the first pass-through connector, the second pass-through connector, a connector strap having a first connector end fastened to the first pass-through connector and a second connector end fastened to the second pass-through connector, a third pass-through connector, a fourth pass-through connector, the first cam buckle strap having a first strap end that is fastened to the third pass-through connector and the first loose end that passes through the first pass-through connector and then passes through the third pass-through connector and then passes through the first pass-through end, and the second cam buckle strap having the second strap end that is fastened to the fourth pass-through connector and the second loose end that passes through the second pass-through connector and then passes through the fourth pass-through connector and then passes through the second pass-through end, wherein the first cargo area for storing a first cargo item is formed between the first cam buckle strap, the first pass-through connector, and the third pass-through connector, wherein a second cargo area for storing a second cargo item is formed between the second cam buckle strap, the second pass-through connector, and the fourth pass-through connector;

securing to a ridged structure the first hook latch and the second hook latch; and tightening by way of the first cam buckle the first hook latch strap and by way of the second cam buckle the second hook latch strap.

\* \* \* \* \*